(12) United States Patent
Yoshida et al.

(10) Patent No.: US 9,099,830 B2
(45) Date of Patent: Aug. 4, 2015

(54) METHOD OF MANUFACTURING A CONNECTOR

(71) Applicant: Japan Aviation Electronics Industry, Limited, Tokyo (JP)

(72) Inventors: Takushi Yoshida, Tokyo (JP); Yuko Motojima, Tokyo (JP); Hiroshi Akimoto, Tokyo (JP); Takahiro Yamaji, Tokyo (JP); Fumio Ishibashi, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 121 days.

(21) Appl. No.: 13/867,156

(22) Filed: Apr. 22, 2013

(65) Prior Publication Data

US 2013/0232787 A1 Sep. 12, 2013

Related U.S. Application Data

(62) Division of application No. 13/135,172, filed on Jun. 28, 2011, now Pat. No. 8,469,743.

(30) Foreign Application Priority Data

Jul. 21, 2010 (JP) ................................ 2010-164184

(51) Int. Cl.
*H01R 43/20* (2006.01)
*H01R 43/24* (2006.01)
(Continued)

(52) U.S. Cl.
CPC ............... *H01R 43/20* (2013.01); *B23K 26/20* (2013.01); *H01R 13/405* (2013.01); *H01R 13/504* (2013.01); *H01R 43/18* (2013.01); *Y10T 29/49211* (2015.01)

(58) Field of Classification Search
CPC .............. H01R 45/02; H01R 43/0221; H01R 43/0228; H01R 43/20; H01R 13/405; H01R 13/504; H01R 43/18; Y10T 29/49211; B23K 26/20
USPC .................................... 29/874, 877, 878, 883
See application file for complete search history.

(56) References Cited

U.S. PATENT DOCUMENTS 3,908,738 A * 9/1975 Bruzas et al. .................... 164/80
3,908,742 A * 9/1975 Schenk et al. .................. 164/80
(Continued)

FOREIGN PATENT DOCUMENTS

| JP | 2006-049118 | 2/2006 |
| JP | 2006-049126 | 2/2006 |

(Continued)

OTHER PUBLICATIONS

Korean Office Action dated May 8, 2012 in Korean Patent Application No. 2011-0061003 along with an English translation of same.

*Primary Examiner* — Carl Arbes
(74) *Attorney, Agent, or Firm* — Collard & Roe, P.C.

(57) ABSTRACT

A connector comprises a base insulator, a plurality of elongated plate shaped contacts arranged on the base insulator, and a cover insulator arranged to hold the contacts in cooperation with the base insulator and welded to the base insulator, the base insulator is provided with a pair of openings arranged to face each other across each of holders and to intersect with the direction in which the holders are arranged.

1 Claim, 14 Drawing Sheets

(51) Int. Cl.
  *H01R 13/405* (2006.01)
  *H01R 13/504* (2006.01)
  *H01R 43/18* (2006.01)
  *B23K 26/20* (2014.01)

(56) References Cited

U.S. PATENT DOCUMENTS 3,909,300 A * 9/1975 Schenk et al. ............... 429/158
5,152,450 A * 10/1992 Okikawa et al. ........... 228/180.5
5,285,949 A * 2/1994 Okikawa et al. ........... 228/179.1
5,793,009 A * 8/1998 Offer ............................. 219/75
6,500,031 B2 12/2002 Morita et al.
2005/0003694 A1 1/2005 Saito et al.

FOREIGN PATENT DOCUMENTS

JP          4030121      10/2007
KR    10-2004-0106232   12/2004

* cited by examiner

METHOD OF MANUFACTURING A CONNECTOR

CROSS REFERENCE TO RELATED APPLICATIONS

This application is a divisional of and Applicant claims priority under 35 U.S.C. §§120 and 121 of parent U.S. patent application Ser. No. 13/135,172 filed Jun. 28, 2011, which application is based upon and claims the benefit of priority from Japanese Patent Application No. 2010-164184, filed Jul. 21, 2010, the disclosures of which is incorporated herein in its entirety by reference. A certified copy of priority Japanese Patent Application No. 2010-164184 is contained in parent U.S. application Ser. No. 13/135,172.

BACKGROUND OF THE INVENTION

This invention relates to a connector, a method of manufacturing the connector and an apparatus for manufacturing the connector and, in particular, to a thin low-profile type connector, such as a connector for connection to a liquid-crystal substrate.

Conventionally, a press-in or insert molding method is widely used in order to fix contacts of a connector to an insulator.

On the other hand, thin displays such as liquid-crystal displays have become common in recent years. Such thin displays are widely used, for example, as large-screen displays such as those of TV sets or small-screen displays such as those of mobile phones.

As a result of this trend, it is required that a connector for connection to a display has a thinner shape, a lower profile and a smaller size.

However, there is a problem that, if an attempt is made to manufacture a connector fulfilling the above-mentioned requirement, using a conventional press-in or insert molding method, the insulator used therein will be too thin to ensure sufficient force to hold the contacts of the connector.

As another problem, the insert molding is not suitable when it is desired to provide the contacts with a spring function.

In order to avoid the above-mentioned problems, proposal is made of a structure in which contacts are interposed between two insulators, and the insulators are welded to each other by a laser or the like.

With this structure, one of the insulators, namely, a base insulator is provided with projections (holders) holding the contacts therebetween. Each contact is inserted between these projections and the other insulator, namely, a cover insulator is welded to the projections, whereby the insulators are welded to each other.

The above-mentioned welding structure, however, requires preventing welding defects.

As the preventing welding defects, JP-A-2006-49118 (Patent Document 1) discloses a structure in which each contact is provided with a notch so that a melted insulator flows into the notch.

Although the technology of Patent Document 1 is successful in reducing the chance of occurrence of welding defects, a destructive inspection is required to determine whether or not any welding defects have actually occurred.

In order to solve this problem, as shown in FIG. 22A and FIG. 22B, a connector 101 is proposed in which openings 7c are provided on the opposite sides of each holder 8 such that a contact 3 is interposed between these openings, so that welding defects can be visually detected by observing an amount of molten resin which has flown into the openings 7c. An example of a connector having such a structure is disclosed in Japanese Patent No. 4030121 (JP-B-4030121) (Patent Document 2).

SUMMARY OF THE INVENTION

The technology described in Patent Document 2 is advantageous in that welding defects can be detected without the need of destructive inspection.

According to the technology described in Patent Document 2, even if the projections are melted only partially, molten resin flows into the entire area of the openings and, therefore, it seems that the projections have entirely been melted. In view of the above, it is more desirable to develop a structure capable of correctly detecting welding defects even in such case.

In addition, according to the technology described in Patent Document 2, the openings are arranged to face each other across each contact (and holder), the total width of the connector (the width in the direction in which the contacts are arranged) becomes broader by the width of the openings.

Thus, in terms of reduction in size of the connector, there is a room for further improvement.

This invention has been made in view of the problems described above, and an object of the invention is to provide a connector having a structure enabling accurate detection of welding defects and size reduction of the connector.

According to one aspect of this invention, there is provided a connector comprising, a contact comprising two side faces, a base insulator comprising a pair of convex holders holding the contact at its side faces with the contact being interposed between the holders, and a cover insulator welded to the holders so as to hold the contact in cooperation with the base insulator, the base insulator further comprising a pair of openings arranged to face each other across each of the holders and to intersect with the direction in which the holder are arranged, the openings being for checking the welded condition of the holders.

According to another aspect of this invention, there is provided a method of manufacturing a connector comprising, interposing a contact comprising two sides between a pair of convex holders of a base insulator so that the contact is held by the holders at the side faces thereof, placing a cover insulator to hold the contact in cooperation with the base insulator; applying laser through the cover insulator to weld the holders of the base insulator to the cover insulator, and determining whether or not welding defects exist on the basis of amounts of a molten material flowing out of the cover insulator and base insulator and flowing into a pair of openings arranged to face each other across each of the holders and to intersect with the direction in which the holders are arranged.

According to still another aspect of this invention, there is provided a connector manufacturing apparatus comprising, a welding unit welding a pair of convex holders of a base insulator arranged to hold each contact comprising two sides and interposed between the holders at the two sides of the contact, to a cover insulator placed to hold the contact in cooperation with the base insulator, by applying laser through the cover insulator with the contact being thus held, an observation unit observing amounts of a molten material flowing out of the cover insulator and base insulator and flowing into a pair of openings arranged to face each other across each of the holders and to intersect with the direction in which the holders are arranged, and a feedback unit adjusting the subsequent laser irradiation conditions based on the amounts of the molten material.

According to this invention, it is possible to provide a connector having a structure enabling accurate detection of welding defects and reduction in size of the connector.

DESCRIPTION OF THE EXEMPLARY EMBODIMENTS

Exemplary embodiments of this invention will be described by way of examples.

At first, with reference to FIGS. 1 to 5, a schematic structure of a connector 100 according to a first embodiment of the invention will be described.

Here, a connector for connection to a liquid-crystal substrate is shown as an example of the connector 100.

Figure 1:
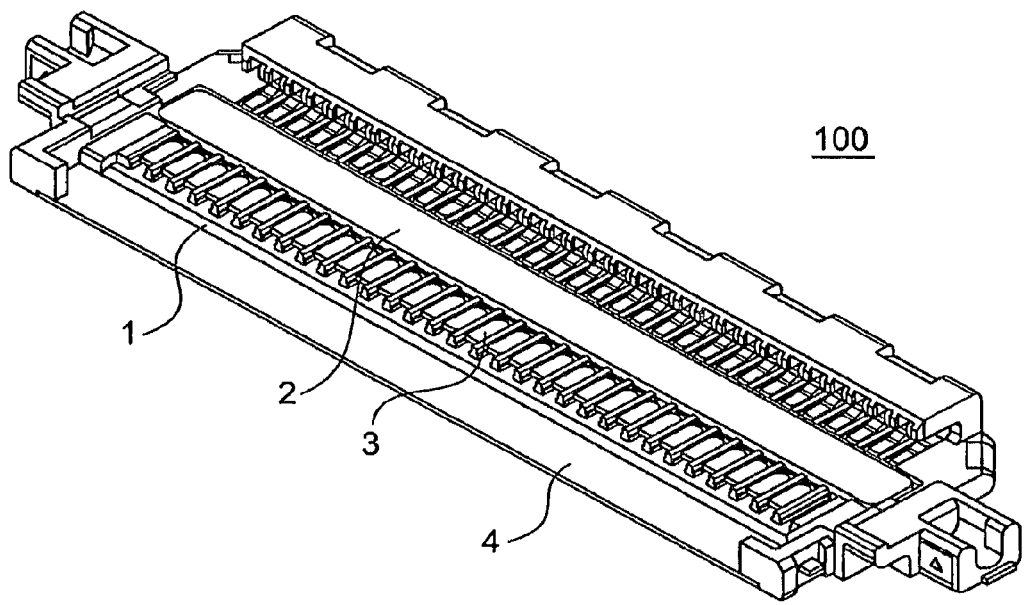
FIG. 1 is a perspective view of a connector according to a first embodiment of the invention.
Figure 2:
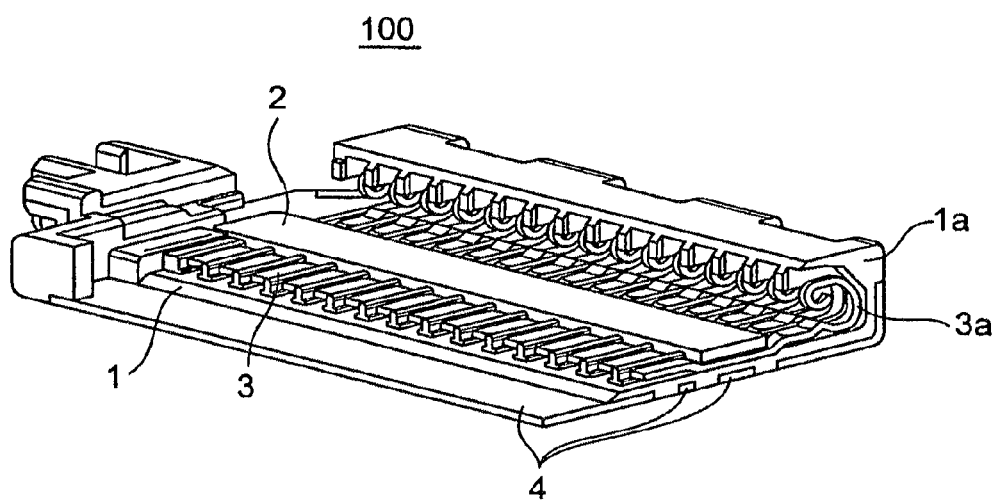
FIG. 2 is a perspective view including a partial cross-sectional view of FIG. 1.

As shown in FIGS. 1 and 2, the connector 100 comprises a base insulator 1 provided on a metal shell 4, a plurality of elongated plate shaped contacts 3 arranged on the base insulator 1, and a cover insulator 2 welded to the base insulator 1. The cover insulator 2 holds the contacts 3 in cooperation with the base insulator 1 with the contacts interposed between the base insulator 1 and the cover insulator 2.

As shown in FIG. 2, the base insulator 1 comprises a hook 1a at one end thereof, and each of the contacts 3 also comprises a hook 3a at one end thereof.

Figure 3:
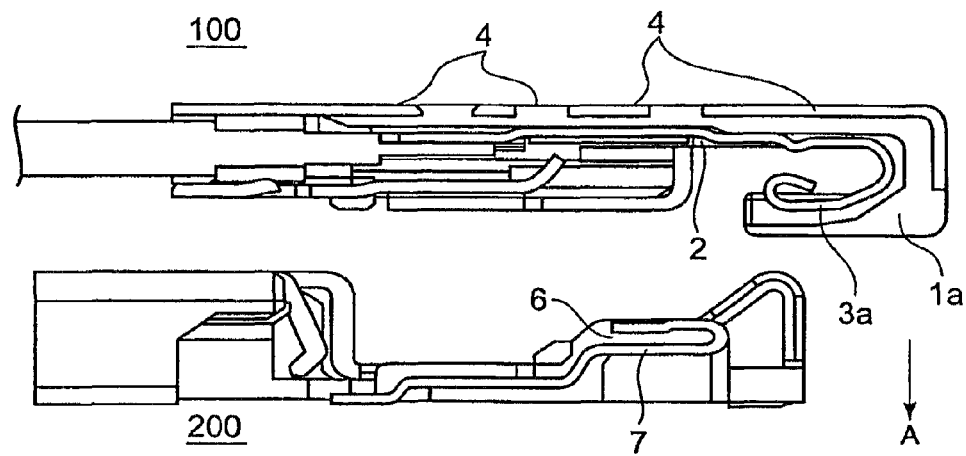
FIG. 3 is a cross-sectional view of the connector and a counterpart connector to which the connector is to be connected.

The connector 100 is connected to a connector having a structure, for example, as that of a counterpart connector 200 shown in FIG. 3.

The counterpart connector 200 is a connector mounted on a board or the like (not shown), and comprises a base insulator 6 and contacts 7 held by the base insulator 6 and having a shape corresponding to that of the hooks 3a.

Figure 4:
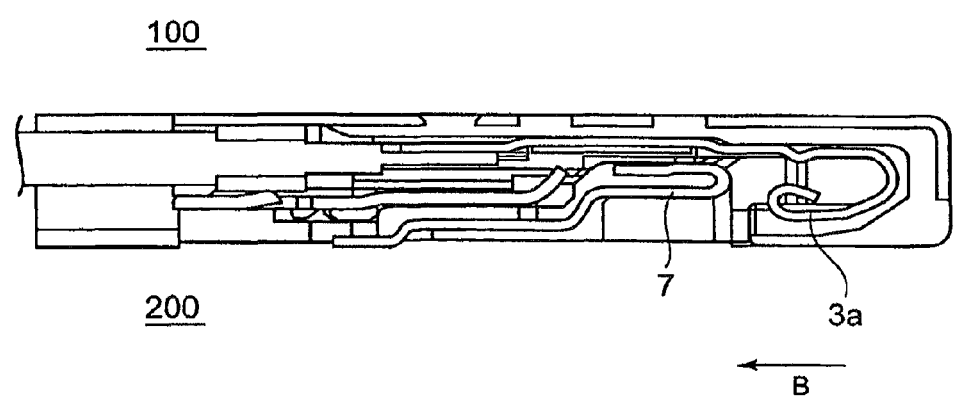
FIG. 4 is a view for describing a procedure for connecting the connector to the counterpart connector.
Figure 5:
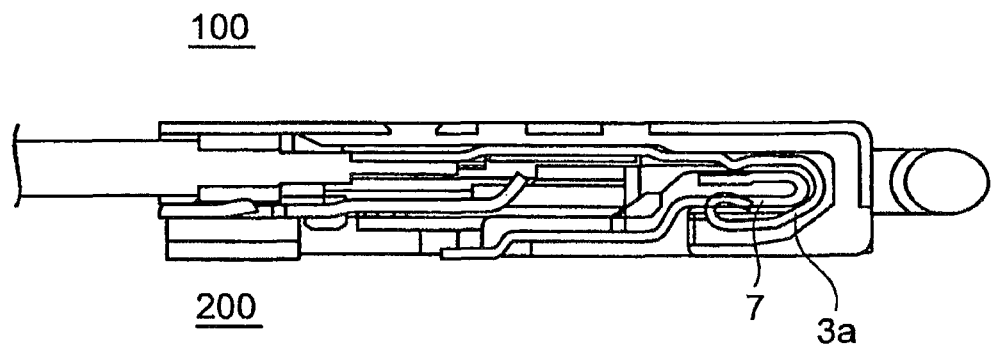
FIG. 5 is a view for describing the procedure for connecting the connector to the counterpart connector.

The connector 100 is moved from the state shown in FIG. 3 in the direction A so that it is placed on top of the counterpart connector 200 as shown in FIG. 4. The connector 100 is then moved in the direction B and, as shown in FIG. 5, the connector 100 is connected to the counterpart connector 200 by causing the hooks 3a to engage with the contacts 7 of the counterpart connector 200.

The connector 100 has a schematic structure as described above.

With reference to FIGS. 6 to 15, the structure of the connector 100, in particular, the structure of a region where the cover insulator 2 and the base insulator 1 are welded to each other will be described in detail.

As shown in FIGS. 6 to 11, the connector 100 comprises a plate-like base insulator 1.

Figure 9:
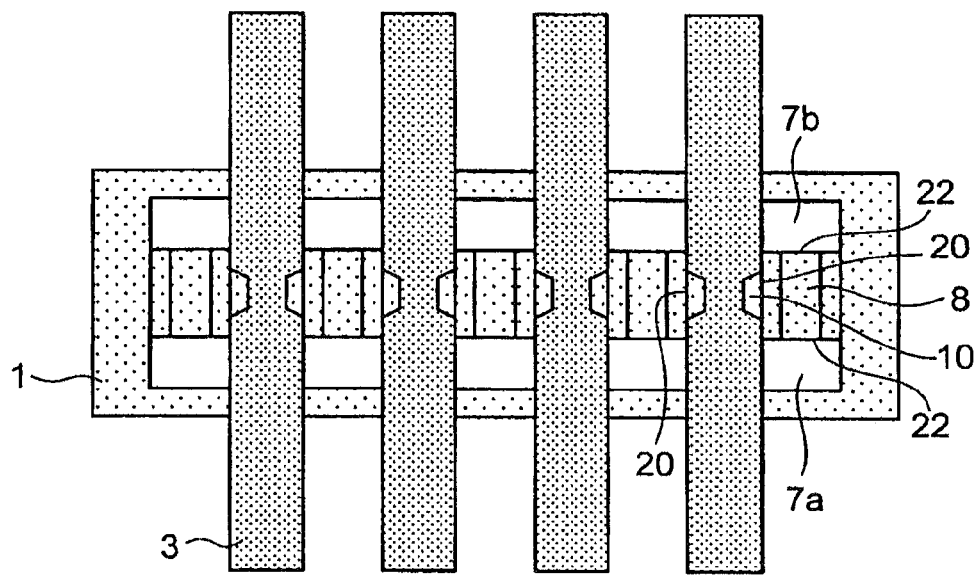
FIG. 9 is a top view (plan view) of FIG. 8.
Figure 10:
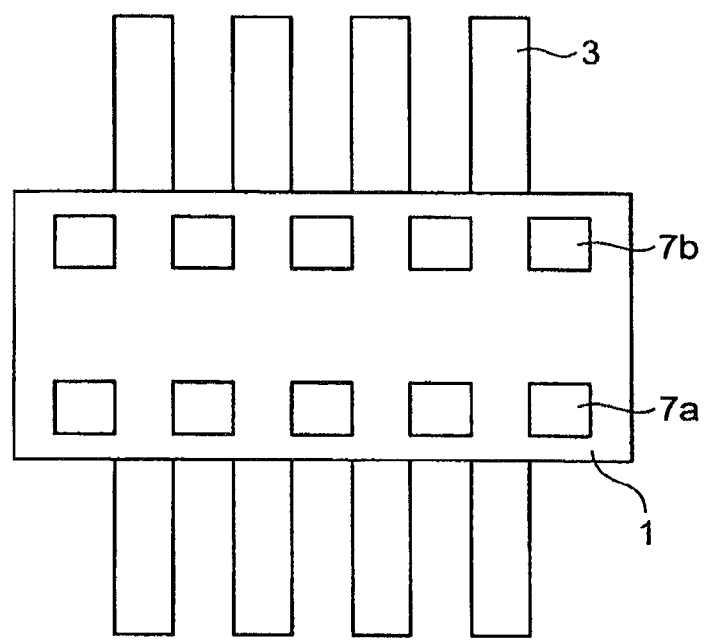
FIG. 10 is a bottom view of FIG. 9.

The base insulator 1 (before welding) comprises holders 8 of a rectangular (quadrangular) convex shape in plan view. As shown in FIG. 9, the holders 8 are arranged at predetermined intervals such that the long sides 20 of the rectangles face each other. As will be described later, the holders 8 are arranged so that each adjacent pair of the holders 8 holds one contact 3 by the sides thereof.

The base insulator 1 is preferably made of a thermoplastic resin since the holders 8 are melted by a laser as will be described later. Such a thermoplastic resin includes, for example, LCP (liquid-crystal polymer), polyamide, and PBT (polybutylene terephthalate).

Preferably, the base insulator 1 contains a pigment such as carbon in order to prevent laser penetration. This is because if the base insulator 1 is made of a material which allows laser to pass through easily, laser irradiation will not raise the temperature, making it difficult to melt the holders.

On the base insulator 1, elongated plate shaped contacts 3 are provided.

The contacts 3 are arranged so that each of the contacts 3 is held between a pair of the holders 8 by the sides thereof.

As shown in FIG. 9, a notch 10 having a trapezoidal shape in plan view is provided in each of the side faces of the contacts 3 facing the holders 8.

Figure 6:
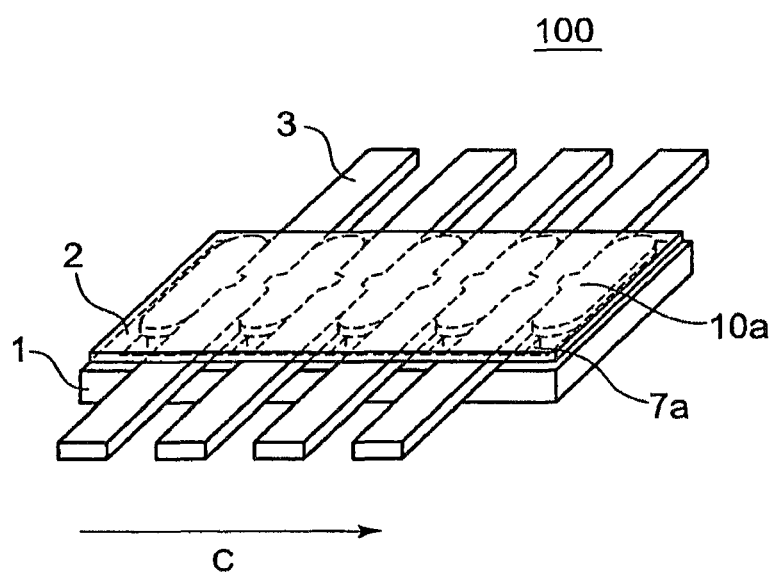
FIG. 6 is a perspective view illustrating a structure around a region where the cover insulator and the base insulator of FIG. 1 are welded to each other.
Figure 7:
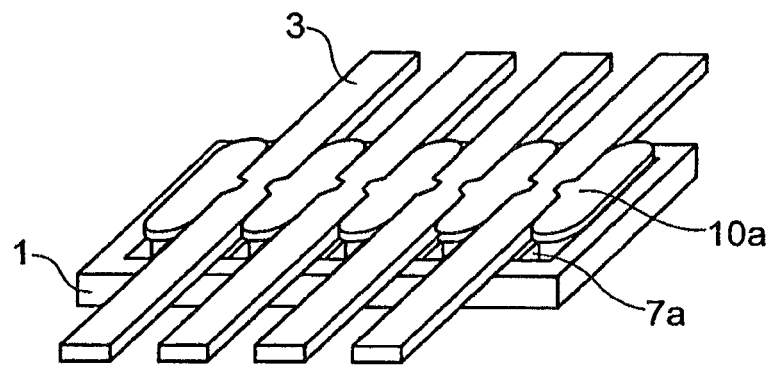
FIG. 7 is a view similar to FIG. 6 but without the cover insulator.

By providing the notches 10, the molten material produced when the holders 8 are melted is allowed to flow into the notches 10, and is hardened there to form stoppers 10a preventing the contacts 3 from being released (see FIG. 6 and FIG. 7).

The connector 100 further comprises a plate-like cover insulator 2 which covers the holders 8 and the contacts 3.

The cover insulator 2 is in contact with the surfaces of the contacts 3 and with the holders 8, and is welded to the holders 8. In this example, the cover insulator 2 is welded to the holders 8 by applying a laser beam along the direction in which the holders 8 are arranged (in the direction C of FIG. 6).

The cover insulator 2 is preferably made of a laser-permeable material. This is because if the cover insulator 2 does not allow laser to transmit therethrough, the laser cannot reach the base insulator 1 to weld it.

Further, the cover insulator 2 is preferably made of a material having a melting point as close to that of the base insulator 1 as possible. This is because if the cover insulator 2, which is to be melted also during the welding process, has a melting point significantly different from that of the base insulator 1, a period of time when either the base insulator or the cover insulator is melted becomes so long that welding defects will more easily occur.

A material suitable for the cover insulator 2 may be the same as that of the base insulator 1. However, an amount of the added pigment (or no pigment added) must be adjusted to facilitate laser transmission.

Figure 8:
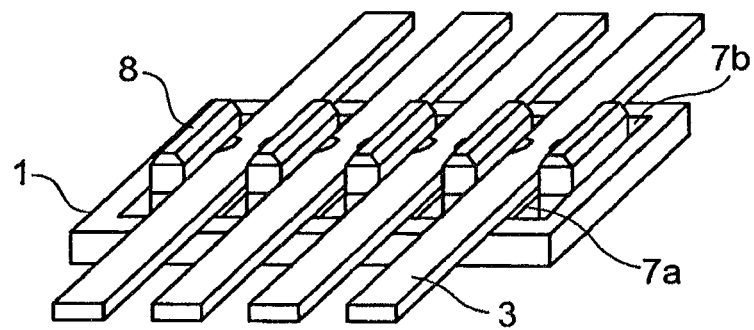
FIG. 8 is a view illustrating the base insulator and contacts before welding.

In this example, as shown in FIGS. 8 and 9, the base insulator 1 comprises a pair of openings 7a, 7b arranged so as to face each other across each of the holders 8 and to intersect with the direction in which the holders 8 are arranged (the direction C of FIG. 6).

More specifically, as shown in FIG. 9, while the sides of the contacts 3 face the long sides 20 of the holders 8, the openings 7a, 7b are provided to face the short sides 22 adjacent to the long sides 20.

This means that the openings 7a, 7b are arranged to face each other, while intersecting with the direction of laser irradiation (at right angles, in this case), and the connector 100 is configured such that each of the holders 8 holds two contacts 3.

Figure 11:
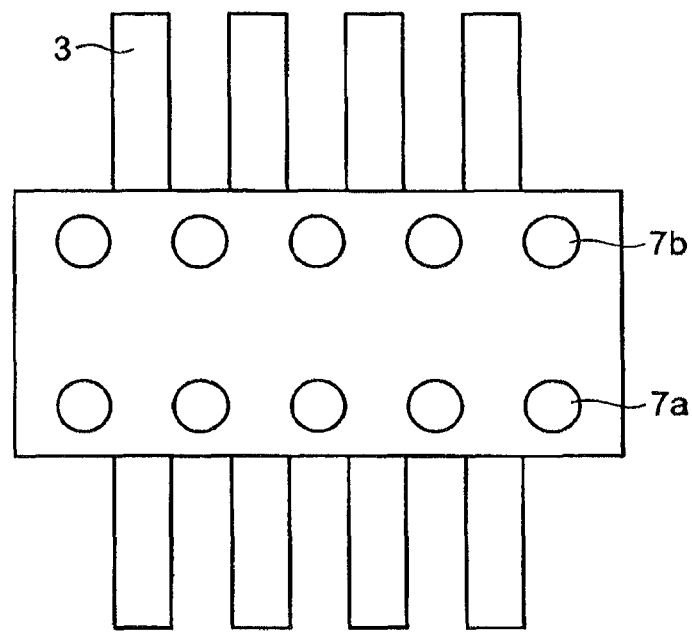
FIG. 11 illustrates a modification of FIG. 10.

Although in FIGS. 6 to 10, the openings 7a, 7b are of a square shape in plan view, the shape of the openings is not limited to the square shape, but may be any appropriate shape, for example, a rounded shape as shown in FIG. 11.

Figure 12:
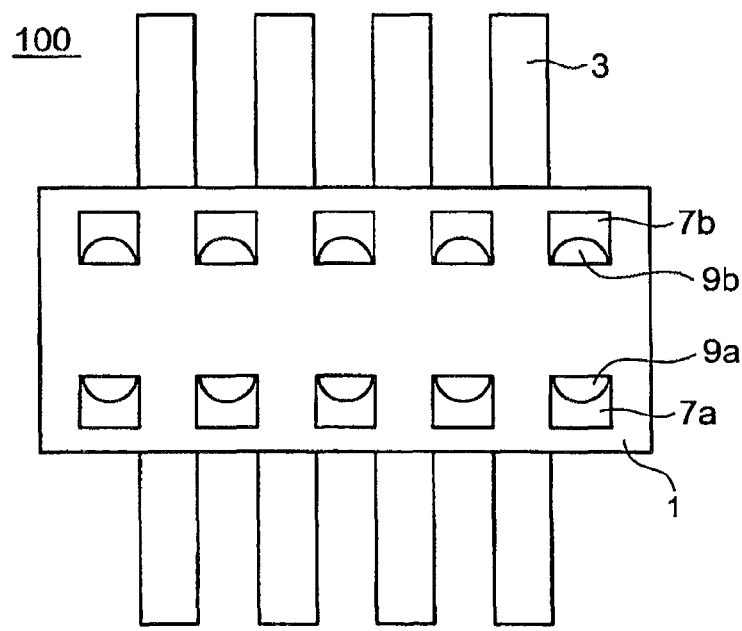
FIG. 12 is a view illustrating the connector after laser welding as seen from the bottom.
Figure 13A:
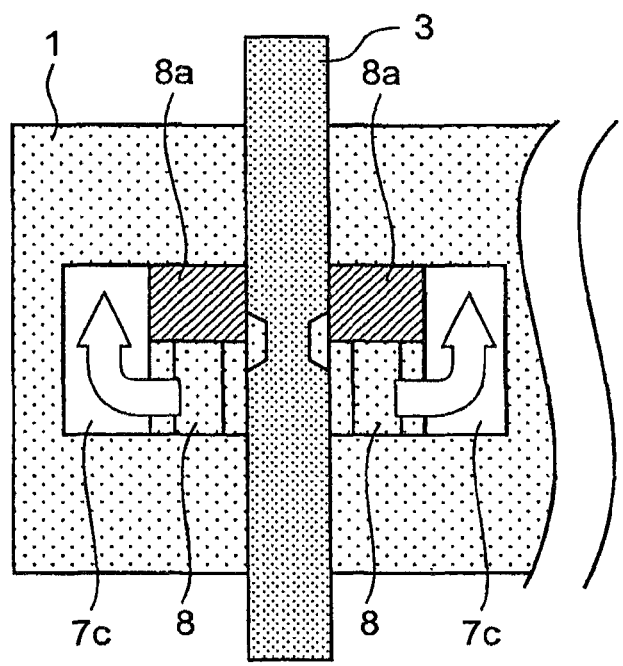
FIGS. 13A and 13B are plan views for explaining a difference in behavior of a molten material during laser irradiation between a first embodiment of the invention and a related art, FIG. 13A illustrating the related art, FIG. 13B illustrating the first embodiment of the invention.
Figure 13B:
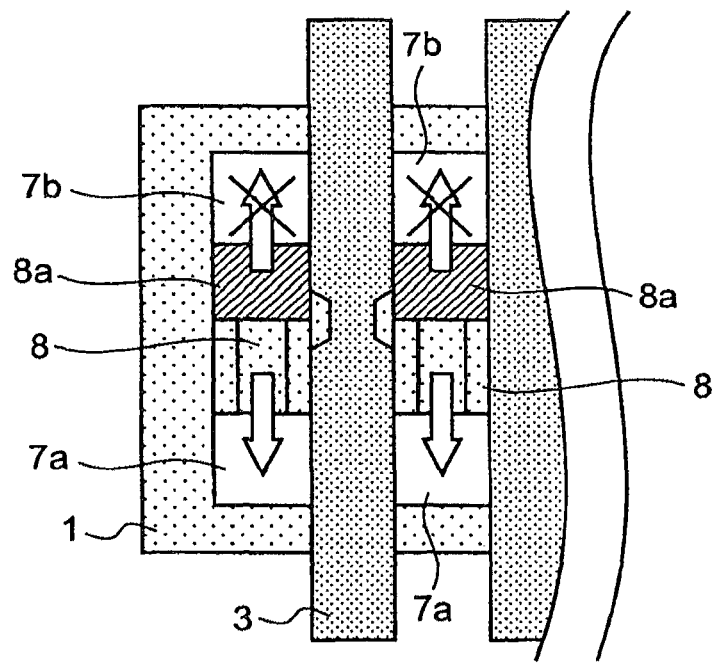
Figure 14:
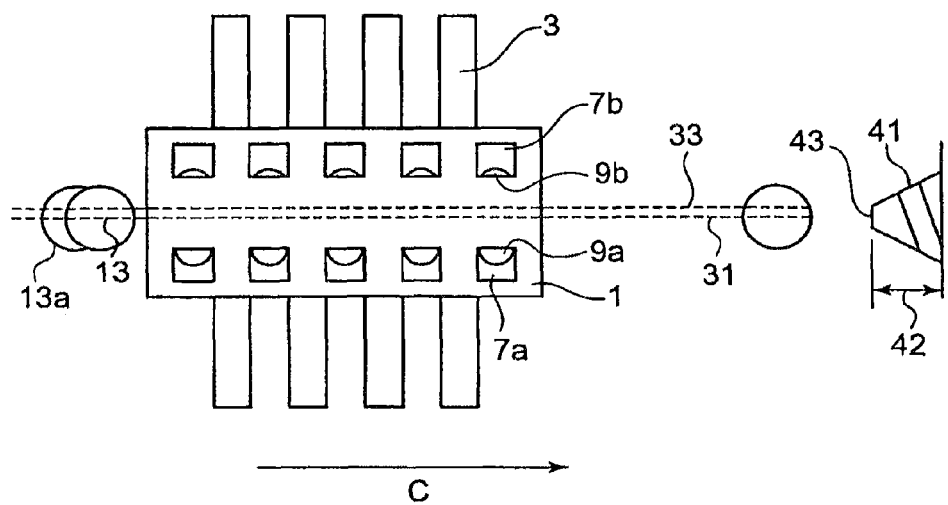
FIG. 14 is a view illustrating a relationship between positions of laser spots and amounts of a material flowing into openings during welding.

With reference to FIGS. 12 to 14, the reasons why the openings 7a, 7b are arranged in this manner will be explained.

There are two reasons why the openings 7a, 7b are arranged in this manner. The first reason is to enable detection of welding defects with high accuracy.

While the cover insulator 2 and the holders 8 are welded to each other by laser irradiation, as described above, the molten material of the cover insulator 2 and holders 8 partially flows out into the openings 7a, 7b during the welding process as shown in FIG. 12.

Therefore, after completion of the welding process, the flow-out material become visible as flow-out portions 9a, 9b as shown in FIG. 12 when the openings 7a, 7b are seen from the bottom of the base insulator 1. This makes it possible to determine whether any welding defects have occurred or not, based on the amount and shape of the material which has flowed into the openings 7a, 7b.

Consideration is given to a case in which, as shown in FIGS. 13A and 13B, one end of any of the holders 8 is not melted sufficiently, that is, a defective welding region 8a is created.

In this case, when the connector has a structure as described in Patent Document 2 and illustrated in FIG. 13A, that is, a structure in which openings 7c are arranged so that a contact 3 (and holders 8) is interposed between these openings, molten material will flow into the openings 7c from other welded regions as indicated by the white arrows in the figure even if there exist defective welding regions 8a. Therefore, it may be wrongly determined that there exist no defective welding regions 8a even though they do exist actually.

According to the structure of the present invention, however, as shown in FIG. 13B, the amount of the material flowing into the opening 7b when a defective welding region 8a is created is smaller than that of the material flowing into the opening 7a.

Therefore, in comparison with the structure of FIG. 13A, the structure of FIG. 13B enables more accurate detection of welding defects.

Description will be made more in detail about the case in which the defective welding region 8a is created.

For the case in which the defective welding region 8a is created, the following two circumstances are assumed.

One of these circumstances is that the laser-irradiated position is biased toward either one of the openings 7a, 7b.

As shown in FIG. 14, a laser has a spot-like shape in plan view. The laser has energy distribution 41 in which the energy 42 is the highest in a region 43 corresponding to the center of the laser spot 13, and decays toward the circumference of the laser spot 13 according to a Gaussian function.

Therefore, when applying a laser beam, the laser beam is applied so that the center of the laser spot 13 passes through the center 33 of the holders 8 in order to prevent unevenness in amount of the molten material.

By applying the laser beam in this manner, the holders 8 are melted evenly from the center to the opposite ends thereof. As a result, the flow-out portions 9a, 9b are formed ideally in the same size (i.e., formed of the same amount of the molten material) as shown in FIG. 12, and no welding defects occur.

However, if the laser-irradiated position, specifically the center 31 of the laser spot 13a is biased from the center 33 of the holders 8 towards the opening 7a, as shown in FIG. 14, the temperature on the side of the openings 7b does not rise so sufficient as the temperature on the side of the openings 7a, whereby a defective welding region 8a is created and the amount of the material flowing into the openings 7b becomes smaller than the amount of the material flowing into the openings 7a.

The other circumstance assumed as the case in which the defective welding region 8a is created is that the laser energy distribution 41 is biased towards either the openings 7a or openings 7b.

As described above, the laser energy distribution 41 is such that the energy 42 decays from the center toward the circumstance of the laser spot 13 according to a Gaussian function.

Figure 15:
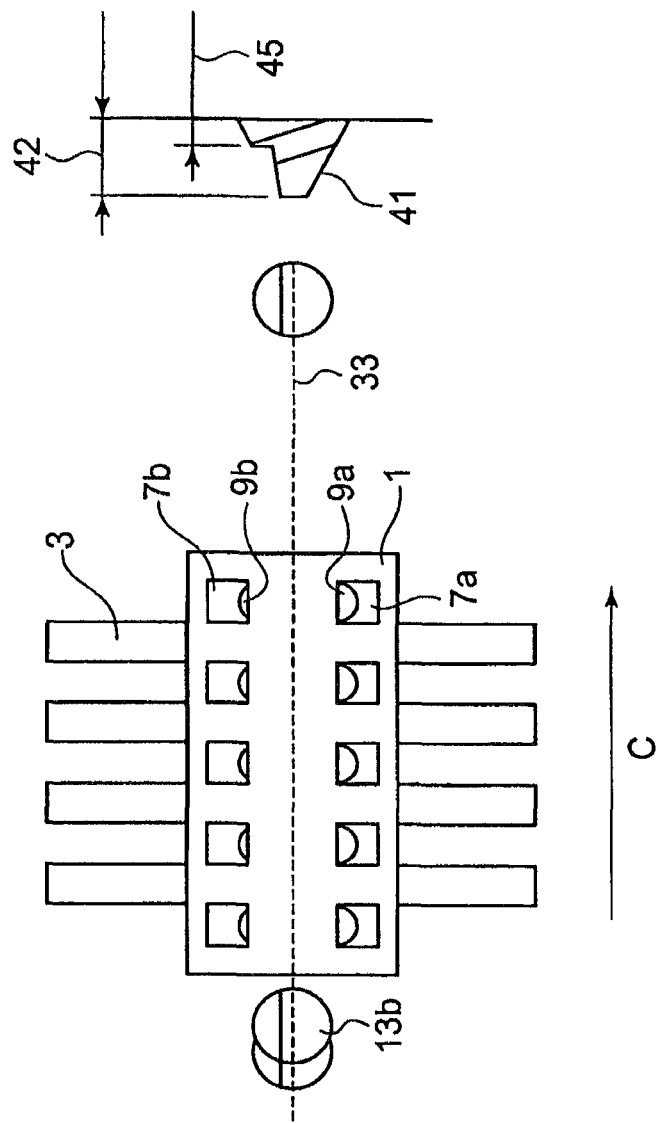
FIG. 15 is a view illustrating a relationship between laser energy distribution and amounts of a material flowing into the openings during welding.

However, if a lens emitting a laser beam is contaminated with dust or the like, or adjustment of an optical system is failed, as shown in FIG. 15, the laser energy distribution 41 will not follow the Gaussian function, and the energy 45 on the side of the openings 7b may become significantly lower than the energy 42 on the side of the openings 7a.

In this case also, the temperature on the side of the openings 7b does not rise so sufficiently as the temperature on the side of the openings 7a, whereby a defective welding region 8a is created and the amount of the material flowing into the openings 7b becomes smaller than the amount of the material flowing into the openings 7a.

In either case, by comparing the amount of the material flowing into the openings 7b with the amount of the material flowing into the openings 7a, it is possible to easily detect welding defects of the connector 100 visually and without performing a destructive test.

As will later be described in detail, in a method of detecting welding defects according to the invention, a correlation is preliminarily measured between welding strength and difference between amount of the material flowing into the openings 7b and amount of the material flowing into the openings 7a. The difference between the actually measured amounts of the material flowing into the openings 7b and the material flowing into the openings 7a is compared with this correlation to determine whether or not the difference is within an allowable range. Based on the result of this determination, whether welding defects exist or not is detected.

The foregoing is the first reason why the openings 7a, 7b are arranged as described above.

The second reason why the openings 7a, 7b are arranged as described above is to reduce the size of the connector.

As described above, according to the structure described in Patent Document 2 and illustrated in FIG. 13A, in which the openings 7c are arranged to face each other across each of the contacts 3 (and the holders 8), the elements are arranged in the sequence of an opening, a holder, a contact, a holder, an opening, a holder, a contact, a holder, an opening and so forth, the dimension of the connector in the direction in which the elements are arranged is determined by the widths of three elements, that is, the contact, the holder, and the opening.

On the other hand, in the structure according to the first embodiment of the invention illustrated in FIG. 13B, the openings 7a, 7b are arranged to intersect (at right angles, in this example) with the direction in which the elements are arranged, and thus, the elements are arranged in the sequence of an opening and holder, a contact, an opening and holder, a contact and so forth in the direction of arrangement.

Therefore, if the openings have the same or shorter width as that of the holders, the dimension of the connector in the direction in which the elements are arranged is determined by the widths of only two elements, that is, the contact and the holder.

Therefore, in comparison with the related art (Patent Document 2) in which the openings 7c are arranged to face each other across the contact 3, the structure of the connector 100 allows the contacts 3 to be arranged at smaller intervals, and thus the overall size of connector 100 can be reduced.

The foregoing is the second reason.

Next, with reference to FIGS. 16 to 19, a structure of a manufacturing apparatus 300 and a method for manufacturing the connector 100 will be described.

Figure 16:
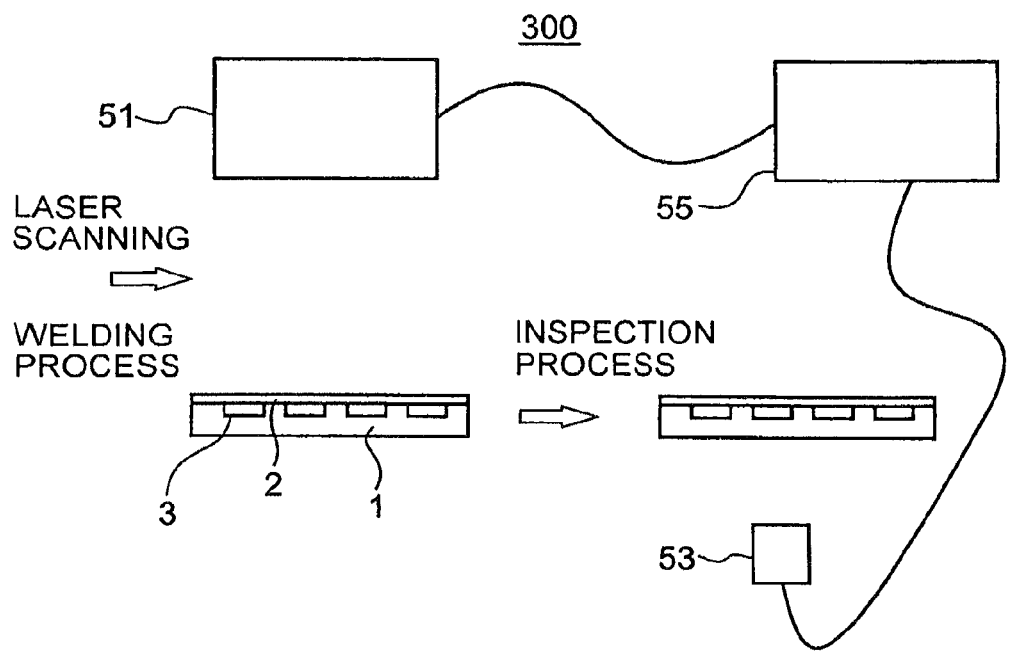
FIG. 16 a schematic view of a manufacturing apparatus.

As shown in FIG. 16, the manufacturing apparatus 300 includes a laser emitting unit 51 (welding unit) comprising a semiconductor laser or the like emitting laser beams, a camera 53 (observation unit) such as a CCD camera taking images of the opening 7a and opening 7b after laser irradiation, and a controller 55 (feedback unit) controlling operation of the laser emitting unit 51 and camera 53.

Figure 17:
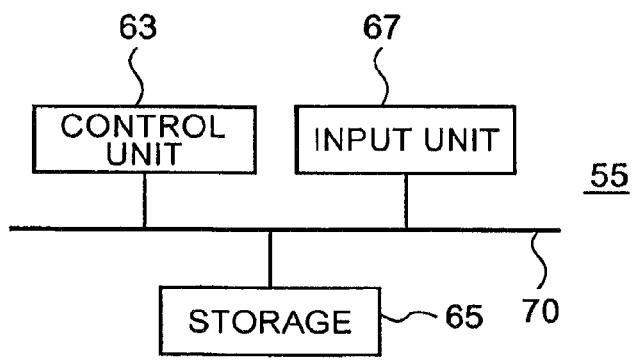
FIG. 17 is a view illustrating a hardware configuration of a controller.

As shown in FIG. 17, the controller 55 includes a control unit 63 comprising a CPU, a ROM, a RAM and so on driving and controlling the components, a storage 65 storing a computer program operating the components, and an input unit 67 such as a mouse and a keyboard inputting measurement conditions and so on, and these components are interconnected via a bus 70.

Figure 18:
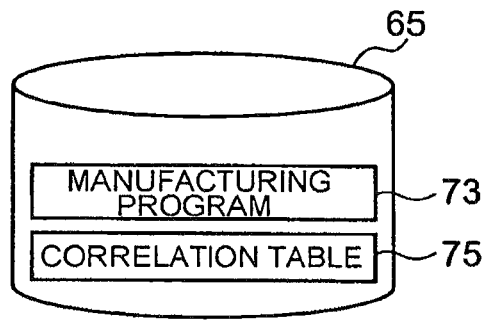
FIG. 18 is a view illustrating a structure of a storage.

As shown in FIG. 18, the storage 65 comprises a manufacturing program 73 implementing this invention, and a correlation table 75 indicating a correlation between welding strength and difference between amount of the material flowing into the opening 7b and amount of the material flowing into the opening 7a.

Next, a method of manufacturing the connector 100 using the manufacturing apparatus 300 will be described.

Figure 19:
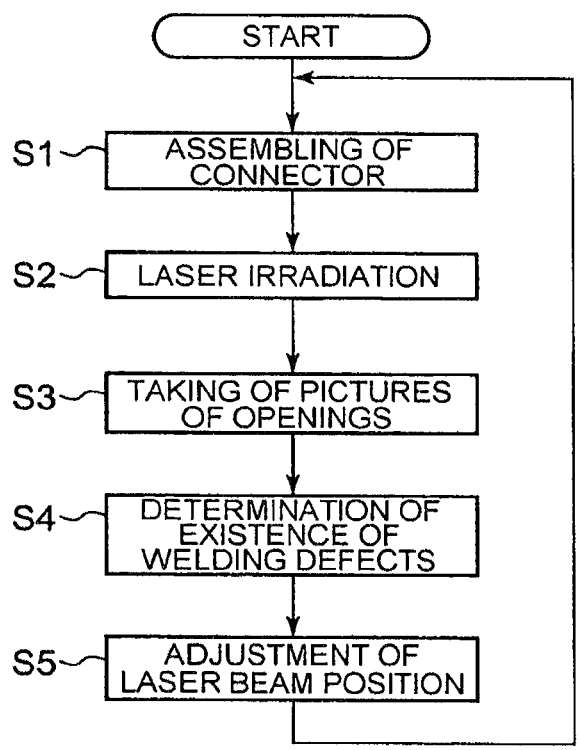
FIG. 19 is a flow chart illustrating a procedure for manufacturing the connector with the use of the manufacturing apparatus.

First, a connector 100 is assembled (S1 of FIG. 19).

Specifically, each contact 3 is inserted between holders 8 on a base insulator 1, and a cover insulator 2 is placed to cover them.

Then, the control unit 63 of the controller 55 activates the manufacturing program 73 so that the holders 8 on the base insulator 1 is irradiated with a laser beam through the cover insulator 2 by the laser emitting unit 51 (S2 of FIG. 19).

The laser irradiation is performed, as shown in FIGS. 14 and 15, by causing the laser emitting unit 51 to scan the whole length of the cover insulator 2, crossing the holders 8. This scanning may be performed a plurality of times according to a strength of the laser beam.

During the laser irradiation, a pressure is applied to the cover insulator 2 to make close contact with the holders 8. The pressure application may be accomplished, for example, by placing a board of a laser-permeable material, such as glass, on top of the cover insulator 2 and clamping them together. As long as a sufficient pressure is ensured, the cover insulator 2 may be clamped only at its ends.

The emitted laser beam passes through the cover insulator 2 to heat the holders 8, whereby the heated holders 8 are melted. At the same time, the cover insulator 2 is also heated and melted by the heat of the holders 8.

The holder 8 and cover insulator 2 which are both melted are welded together, while part of the molten material flows out into the openings 7a, 7b as flow-out portions 9a, 9b as described before.

Using the camera 53, the control unit 63 of the controller 55 takes images (pictures) of the openings 7a and openings 7b from the rear side of the cover insulator 2 (the opposite side of the cover insulator 2 opposite to the surface where the contacts 3 are arranged) (S3 of FIG. 19).

The control unit 63 of the controller 55 then reads a difference between the amount of the material flowing into the openings 7a and the amount of the material flowing into the openings 7b on the basis of the images of the openings 7a and openings 7b taken with the camera 53, and determines with reference to the correlation table 75 whether or not any welding defects exist (whether or not the difference is within the allowable range) (S4 of FIG. 19).

If it is determined that welding defects exist, the relevant connector is discarded.

Then, based on the difference between the amount of the material flowing into the opening 7a and the amount of the material flowing into the opening 7b, the control unit 63 of the controller 55 adjusts the laser irradiation conditions including the laser beam position so that the difference becomes zero, and then returns to S1 (S5 of FIG. 19).

In this manner, the welding defects due to laser beam misalignment can be prevented by feeding back the laser irradiation conditions on the basis of the difference between the amount of the material flowing into the opening 7a and the amount of the material flowing into the opening 7b. Further, even if welding defects occur, the irradiation conditions can be immediately adjust to prevent the occurrence of such welding defects.

The foregoing is the description of the method of manufacturing the connector 100 using the manufacturing apparatus 300.

According to the first embodiment, as described above, the connector 100 comprises the cover insulator 2, the contacts 3, and the base insulator 1, and the base insulator 1 is provided with a pair of openings 7a, 7b arranged to face each other across each of the holders 8 and to intersect with the direction in which the holders 8 are arranged.

According to this structure, welding defects can be easily detected visually, without conducting a destructive test, by comparing the amount of the material flowing into the openings 7b with the amount of the material flowing into the openings 7a.

Further, in the connector 100 according to the first embodiment, the openings 7a, 7b are arranged to face each other across each of the holders 8 and to intersect with the direction in which the holders 8 are arranged.

This structure makes it possible to reduce the interval between the adjacent contacts 3 and thus to reduce the overall size of the connector 100 in comparison with the case in which the openings 7c are arranged to face each other across each of the contacts 3.

Next, with reference to FIGS. 20A to 21B, a second embodiment of the invention will be described.

The second embodiment is the similar to the first embodiment except that a stopper is formed in a portion of each contact so as to project from its side toward an opening.

In the description of the second embodiment, components having the functions same as those of the first embodiment are denoted with the same reference numerals. Description will be made principally of those components different from the first embodiment.

Figure 20A:
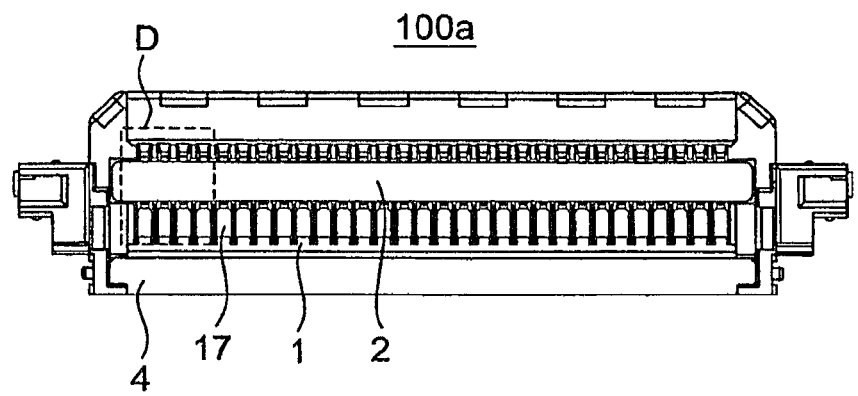
FIGS. 20A to 20C shows a connector according to a second embodiment of the invention, FIG. 20A being a plan view, FIG. 20B showing a state in which a cable is attached to the connector of FIG. 20A, FIG. 20C being a cross-sectional view of the connector of FIG. 20B.
Figure 20B:
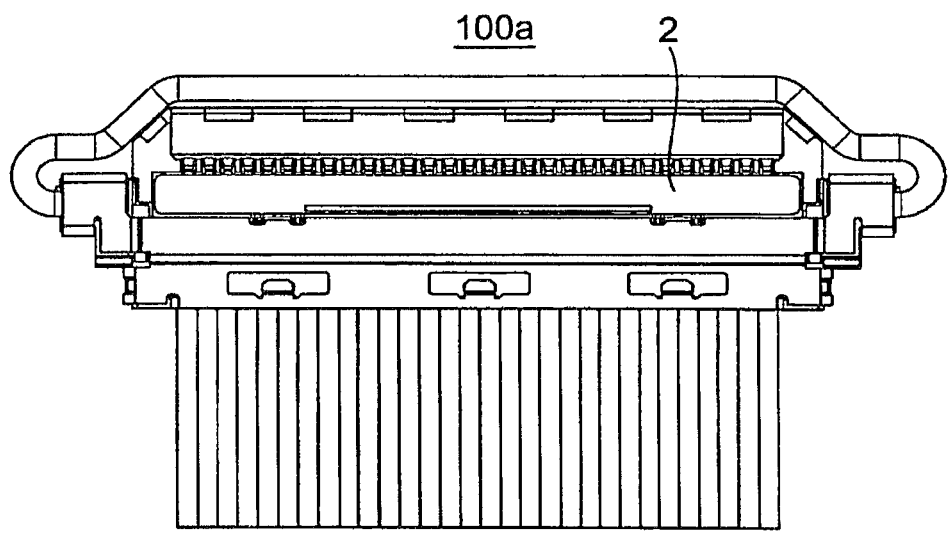
Figure 20C:
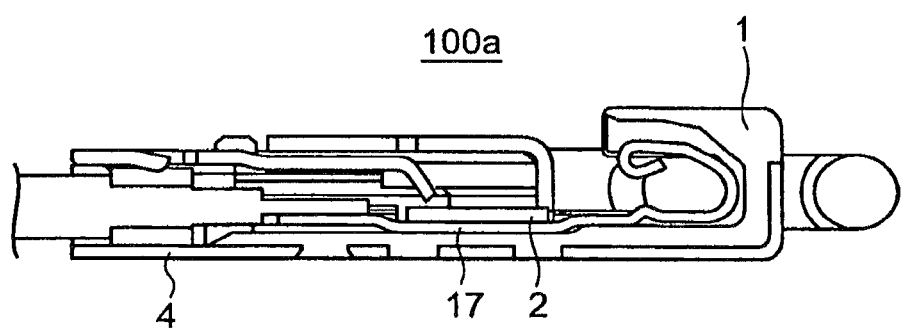

As shown in FIGS. 20A, 20B and 20C, like the connector 100 according to the first embodiment, a connector 100a according to the second embodiment includes a cover insulator 2, contacts 17, and a base insulator 1.

Figure 21A:
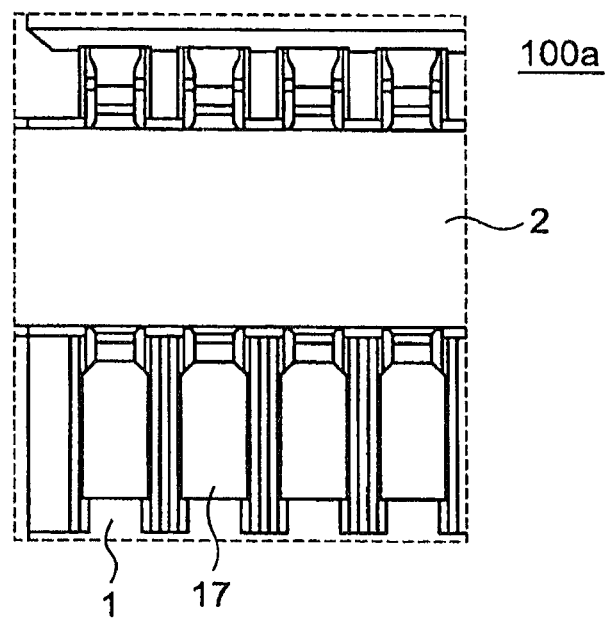
FIGS. 21A and 21B are enlarged views of the region D in FIG. 20A, FIG. 21A being a view with the cover insulator, FIG. 21B being a view without the cover insulator.
Figure 21B:
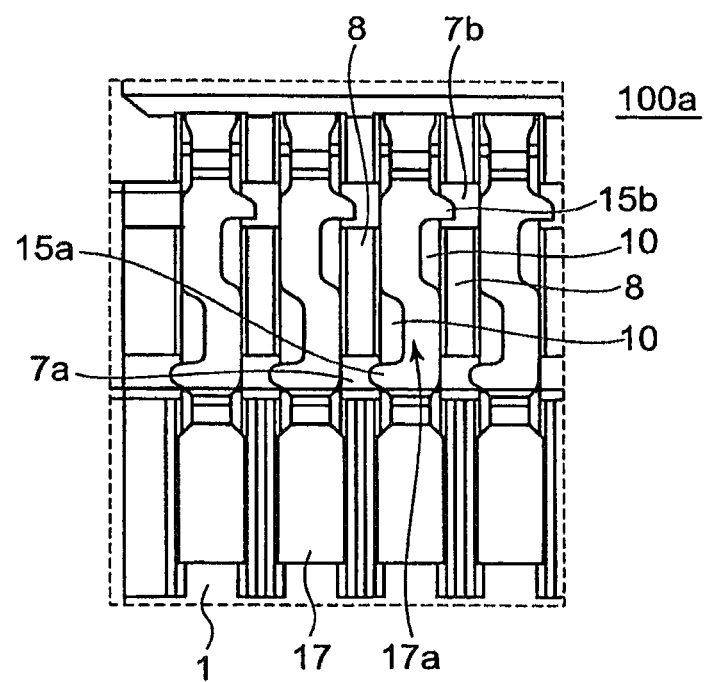
Figure 22A:
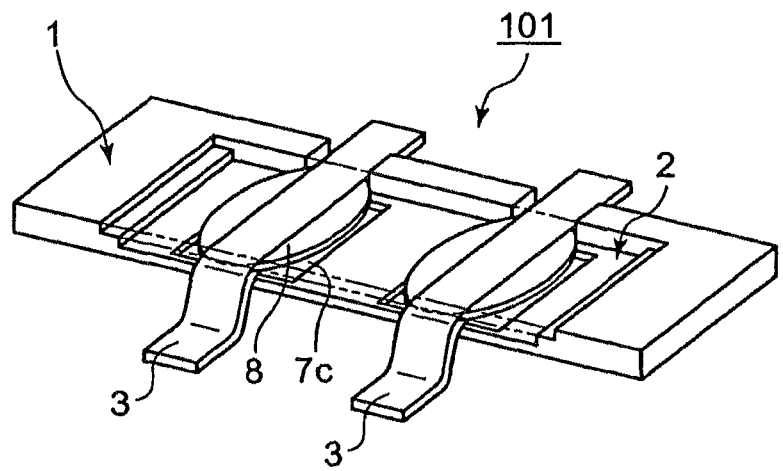
FIGS. 22A and 22B are perspective views of a connector according to a related art, FIG. 22A being a view with a cover insulator, FIG. 22B being a bottom view of FIG. 22A.
Figure 22B:
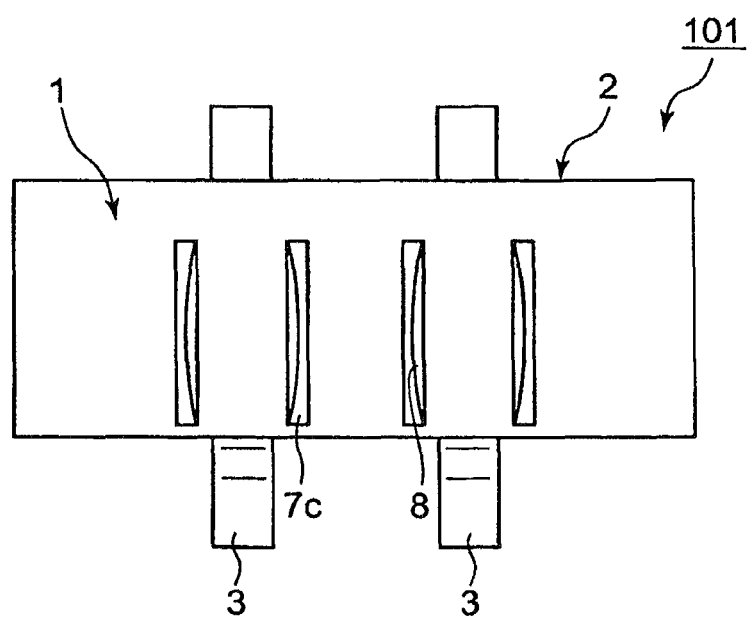

As shown in FIGS. 21A and 21B, each of the contacts 17 comprises a stopper 17a which is formed into an S-shape in plan view between an opening 7a and an opening 7b, while the opposite ends 15a and 15b of the S-shape are projected from the sides of the contact 17.

More specifically, one end 15a of the S-shaped stopper 17a projects toward the adjacent left side opening 7a (toward the open side thereof), and its projection plane overlaps the opening 7a.

The other end 15b of the S-shaped stopper 17a projects toward the adjacent right side opening 7b (toward the open side thereof), and its projection plane overlaps the opening 7b.

A bend portion of the S shape forms a notch 10 in the same manner as in the first embodiment.

Thus, the contacts 17 may comprise portions (i.e. the ends 15a, 15b) projecting toward the openings 7a, 7b. According to this structure, even if a force is applied to the contacts 17 in the longitudinal direction thereof, the ends 15a, 15b of the contacts are kept in contact with the holders 8 (or flow-out portions 9a, 9b) to restrict the movement, whereby the contacts 17 can be held more reliably on the base insulator 1.

According to the second embodiment, as described above, the connector 100a comprises the cover insulator 2, the contacts 17, and the base insulator 1, and the base insulator 1 is provided with a pair of openings 7a, 7b arranged to face each other across each of the holders 8 and to intersect with the direction in which the holders 8 are arranged.

Therefore, the second embodiment provides the same advantageous effects as those of the first embodiment.

Further, according to the second embodiment, each of the contacts 17 comprises the stopper 17a of a S-shape in plan view formed between the openings 7a and 7b, with the opposite ends 15a, 15b of the S shape projecting from the sides of the contact 17.

According to this structure, even if a force is applied to the contacts 17 in the longitudinal direction thereof, the ends 15a, 15b of the contacts 17 are kept in contact with the holders (or flow-out portions 9a, 9b) to restrict the movement, whereby the contacts 17 can be held more reliably on the base insulator 1.

Although the foregoing description has been made in connection with the case in which this invention is applied to a connector for connection to a liquid-crystal substrate, this invention is not limited to the above-mentioned case at all but is applicable to all the types of connectors which are desired to be reduced in thickness, height, and size.

What is claimed is:

1. A method of manufacturing a connector comprising:
   interposing a contact comprising two sides between a pair of convex holders of a base insulator so that the contact is held by the holders at the side faces thereof;
   placing a cover insulator to hold the contact in cooperation with the base insulator;
   applying laser through the cover insulator to weld the holders of the base insulator to the cover insulator; and
   determining whether or not welding defects exist on the basis of amounts of a molten material flowing out of the cover insulator and base insulator and flowing into a pair of openings arranged to face each other across each of the holders and to intersect with the direction in which the holders are arranged.

* * * * *